United States Patent
Mianzo et al.

(10) Patent No.: US 10,332,272 B2
(45) Date of Patent: Jun. 25, 2019

(54) SYSTEMS AND METHODS FOR TESTING AN AUTOMATIC PERCEPTION SYSTEM

(71) Applicant: Caterpillar Inc., Peoria, IL (US)

(72) Inventors: Lawrence Andrew Mianzo, Pittsburgh, PA (US); Joseph Forcash, Zelienople, PA (US); Tod Andrew Oblak, Pittsburgh, PA (US); Jeffrey T. Stringer, Pittsburgh, PA (US); Mark Hartman, Edwards, IL (US); Jeffrey J. Carter, Jr., Princeville, IL (US)

(73) Assignee: Caterpillar Inc., Deerfield, IL (US)

( * ) Notice: Subject to any disclaimer, the term of this patent is extended or adjusted under 35 U.S.C. 154(b) by 87 days.

(21) Appl. No.: 15/670,108

(22) Filed: Aug. 7, 2017

(65) Prior Publication Data
US 2019/0043213 A1   Feb. 7, 2019

(51) Int. Cl.
| | | |
|---|---|---|
| G06K 9/00 | (2006.01) | |
| G06T 7/70 | (2017.01) | |
| G01V 8/10 | (2006.01) | |
| G06K 9/62 | (2006.01) | |
| G06T 11/60 | (2006.01) | |
| G06K 9/46 | (2006.01) | |

(52) U.S. Cl.
CPC .............. G06T 7/70 (2017.01); G01V 8/10 (2013.01); G06K 9/4604 (2013.01); G06K 9/6202 (2013.01); G06K 9/6269 (2013.01); G06T 11/60 (2013.01)

(58) Field of Classification Search
CPC ......... G06T 7/70; G06T 11/06; G06K 9/6269; G06K 9/4604; G06K 9/6202; G01V 8/10
See application file for complete search history.

(56) References Cited

U.S. PATENT DOCUMENTS

| | | | |
|---|---|---|---|
| 2007/0279494 A1* | 12/2007 | Aman | G01S 3/7864 348/169 |
| 2012/0250983 A1 | 10/2012 | Meng et al. | |
| 2013/0016216 A1 | 1/2013 | Nentwig | |
| 2014/0050405 A1 | 2/2014 | Del Amo et al. | |
| 2015/0179219 A1* | 6/2015 | Gao | G06K 9/00664 386/278 |
| 2015/0356743 A1* | 12/2015 | Kintou | G06T 3/40 382/103 |
| 2016/0086033 A1 | 3/2016 | Molin et al. | |

FOREIGN PATENT DOCUMENTS

| | | |
|---|---|---|
| EP | 2993621 | 3/2016 |
| KR | 101592889 | 2/2016 |

* cited by examiner

*Primary Examiner* — Tom Y Lu

(57) ABSTRACT

A method for testing a perception system is disclosed. The method includes detecting, by a processor, one or more objects in a composite image, the composite image including a first image and at least a portion of a second image. A first set of objects are detected in the first image. Further, the method includes comparing, by the processor, a second set of objects of the one or more objects detected in the portion of the second image with a set of previously detected objects in the portion of the second image. Furthermore, the method includes validating, the performance of the processor in the detection of the first set of objects in the first image by ensuring the second set of objects detected in the at least a portion of a second image matches the set of previously detected objects in the portion of the second image.

20 Claims, 7 Drawing Sheets

SYSTEMS AND METHODS FOR TESTING AN AUTOMATIC PERCEPTION SYSTEM

TECHNICAL FIELD

The present disclosure relates to image processing. More specifically, the present disclosure relates to systems and methods for testing an automatic perception system.

BACKGROUND

An automatic perception system may enable various machines, such as haul trucks, dozers, cold planers, cold recyclers, and pavers, to detect one or more objects while the machine operates in a worksite. Based on the detection of the one or more objects, the machine may alter/modify its operation. For example, if the machine traverses from one location to another along a path and if along the path the automatic perception system detects an object, the machine may dynamically modify the traversal path or may pause its operation.

In certain scenarios, the automatic perception system may erroneously detect the one or more objects due to certain ambiguities or corruption in the algorithm to detect the one or more objects. This may further hamper the overall operation of the machine in which such automatic perception system is installed. Therefore, it is imperative that the automatic perception system seamlessly and accurately detects the one or more objects.

US patent application number 20120250983 discloses an object detecting apparatus and method. The object detecting apparatus comprises: a detection classifier, configured to detect an object in an input image to obtain one or more candidate objects; a verifying classifier, configured to verify each candidate object by using verifying features from an image block corresponding to the each candidate object; and an on-line learning device, configured to train and optimize the detection classifier by using image blocks corresponding to the candidate objects as on-line samples, based on verifying results of the candidate objects obtained by the verifying classifier.

SUMMARY

According to an aspect the present disclosure a method for testing a perception system is disclosed. The method includes detecting, by a processor, one or more objects in a composite image, the composite image including a first image and at least a portion of a second image. A first set of objects are detected in the first image. Further, the method includes comparing, by the processor, a second set of objects of the one or more objects detected in the portion of the second image with a set of previously detected objects in the portion of the second image. Furthermore, the method includes validating, the performance of the processor in the detection of the first set of objects in the first image by ensuring the second set of objects detected in the at least a portion of a second image matches the set of previously detected objects in the portion of the second image.

According to the aspects of the present disclosure an image capturing device is disclosed. The image capturing device includes an image sensor. Further, the image capturing device includes a processor coupled to the image sensor configured to detect one or more objects in a composite image, the composite image including a first image and at least a portion of a second image. A first set of objects is detected in the first image. The processor is further configured to compare a second set of objects of the one or more objects detected in the portion of the second image with a set of previously detected objects in the portion of the second image. Furthermore, the processor is configured to validate the performance of the processor in the detection of the first set of objects in the first image by ensuring the second set of objects detected in the at least a portion of a second image matches the set of previously detected objects in the portion of the second image.

DETAILED DESCRIPTION

Figure 1:
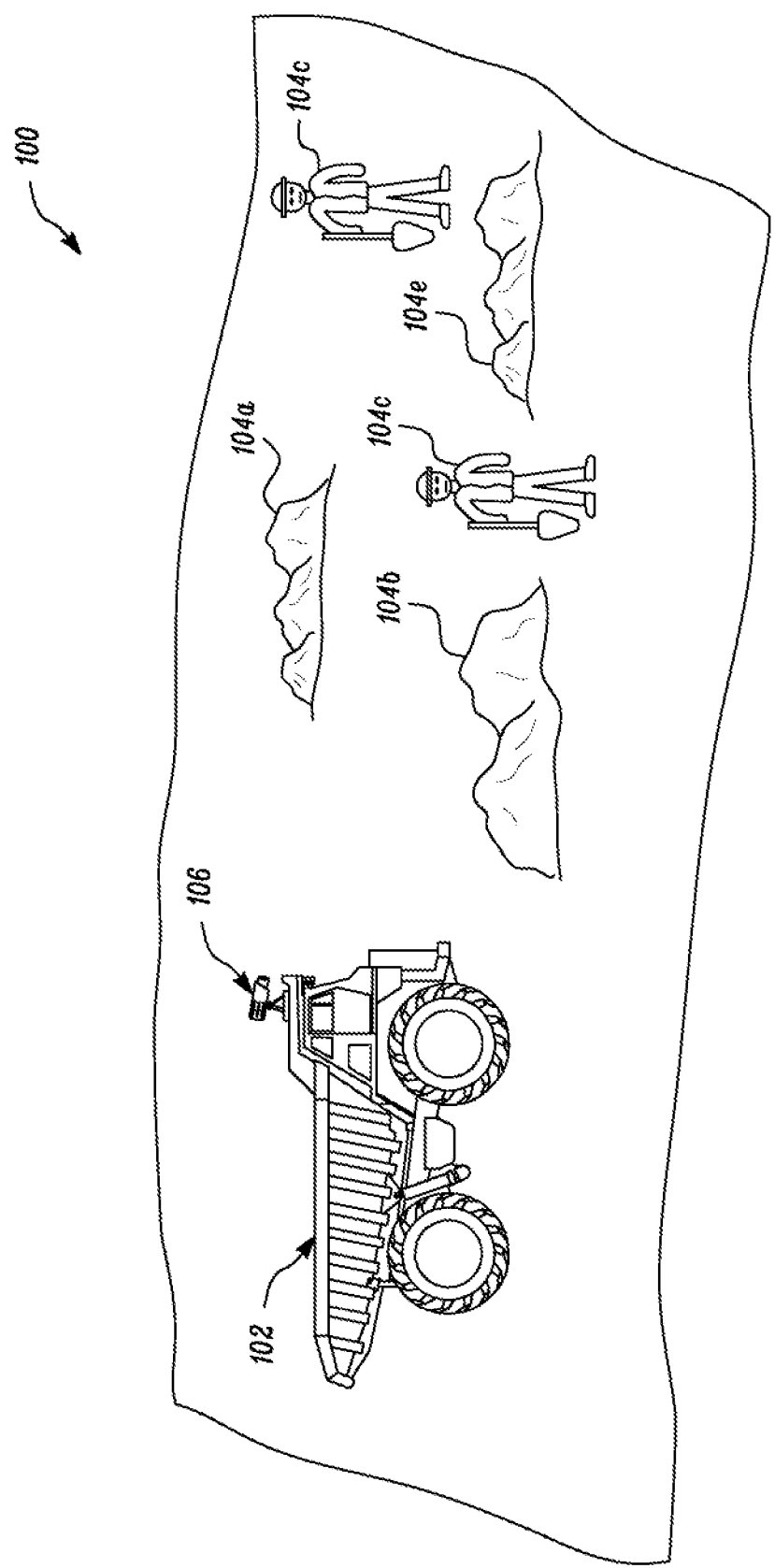
FIG. 1 illustrates an exemplary worksite, in accordance with certain implementations of the present disclosure.

Referring to FIG. 1, a worksite 100 is illustrated. In an embodiment, the worksite 100 may correspond to a mining site, a construction site, or any other worksite, where a machine is used to perform a task. As illustrated in FIG. 1, the worksite 100 includes a machine 102 and a first set of objects 104a, 104b, 104c, 104d, and 104e (hereinafter referred to as the first set of objects 104).

The machine 102 may correspond to a haul truck that operates in the worksite 100 to transport material from one location to another location. In an embodiment, the machine 102 may be a fully autonomous machine that transports the material without manual intervention. For the machine 102 to operate in the fully autonomous mode, the machine 102 includes a perception system 106. In an embodiment, the perception system 106 may be configured to detect the first set of objects 104 in the worksite 100 during the operation of the machine 102. For example, during commutation of the machine 102 from one location to another, the perception system 106 may be configured to detect the first set of objects 104 along a path of the machine 102. Based on the detection of the first set of objects 104, the perception system 106 may send a signal to the machine 102 to either modify a commutation path or to halt the operation. The structure and the operation of the perception system 106 has been described later in conjunction with FIG. 2.

A person having ordinary skills in the art would appreciate that the scope of the disclosure is not limited to the machine 102 being a haul truck. In an embodiment, the machine 102 may correspond to any other machine, without departing from the scope of the disclosure. Further, with reference to the perception system 106, it may be contemplated that the scope of the disclosure is not limited to having the perception system 106 installed on the machine 102. In an embodiment, the perception system 106 may be installed at a remote location on a remote server. In such an implementation, an image capturing device is installed on the machine 102. The image capturing device may transmit the captured data to the remote server for further processing by the perception system 106.

Figure 2:
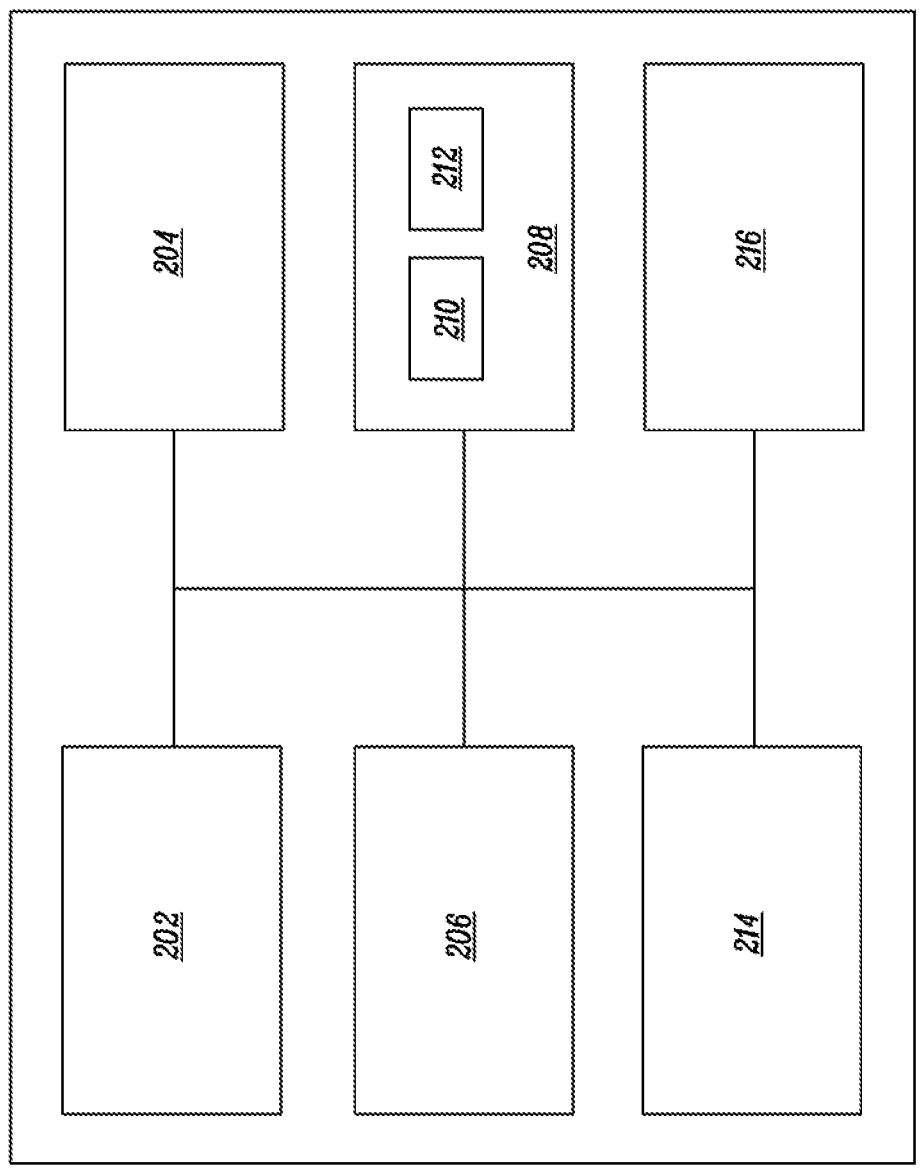
FIG. 2 illustrates a schematic diagram of a perception system, in accordance with certain implementations of the present disclosure.

Referring to FIG. 2, a block diagram of the perception system 106 is illustrated. The perception system 106 has been described in conjunction with FIG. 1. The perception system 106 includes a processor 202, an image capturing device 204, a transceiver 206, a memory device 208, a training unit 214, and a performance evaluation unit 216. The memory device 208 further includes a classifier 210 and an object tracker 212.

In an embodiment, the processor 202 may be located on the machine 102 and may be configured to control one or more sub-systems of the machine 102. The processor 202 is communicably connected to the image capturing device 204, the transceiver 206, the memory device 208, the training unit 214, and the performance evaluation unit 216. The processor 202 is configured to execute one or more instructions stored in the memory device 208 to perform a predetermined operation. Further, the processor 202 is configured to control the operation of each of the image capturing device 204, the transceiver 206, the memory device 208, the training unit 214, and the performance evaluation unit 216. Examples of the processor 202 include, but are not limited to, an X86 processor, a Reduced Instruction Set Computing (RISC) processor, an Application Specific Integrated Circuit (ASIC) processor, a Complex Instruction Set Computing (CISC) processor, an Advanced RISC Machine (ARM) processor or any other processor. The operation of the processor 202 will be described later.

The image capturing device 204 is configured to capture at least one image of the worksite 100 in which the machine 102 operates. In an embodiment, the image capturing device 204 may include an image sensor that is configured to capture the image. In an embodiment, the image sensor may convert the light into electrical signals, which are utilized to create the image. Some examples of the image sensor may include, but are not limited to, a complementary metal-oxide-semiconductor (CMOS) sensor, a charge coupled devices (CCD) sensor, a Light Detection and Ranging (LIDAR) sensor, and/or the like. The image capturing device 204 may further be configured to capture a video stream of the worksite 100, while the machine 102 operates in the worksite 100. A person having ordinary skills in the art would appreciate that capturing the video stream involves capturing predetermined number of image frame per second. For example, to capture the video stream of the worksite 100, the image capturing device 204 may be configured to capture 30 image frames per second. However, it may be contemplated that the video stream may have frames captured at a rate more than 30 frames/second or less than 30 frames/second. The image capturing device 204 may be configured to transmit the captured image or the captured video stream to the processor 202 for further processing using one or more communication protocols.

In an embodiment, the transceiver 206 may enable communication between the image capturing device 204, the processor 202 and the memory device 208 using one or more communication protocols, such as, I2C®, Zigbee®, Infrared, and Bluetooth®. Additionally, the transceiver 206 may be further configured to transmit and receive messages and data to/from various devices/machines operating in the worksite 100 (e.g., the remote server) over a communication network in accordance with the various communication protocols, such as, TCP/IP, UDP, and 2G, 3G, or 4G communication protocols.

The memory device 208 stores a set of instructions that are executable by the processor 202 to perform the predetermined operation. For example, the memory device 208 may be configured to store the set of instructions that correspond to the classifier 210 and the object tracker 212. In an embodiment, the classifier 210 may be configured to detect one or more objects in an image. For example, the classifier 210 may be configured to detect the first set of objects 104 in the image representing the worksite 100. Additionally, the classifier 210 may be configured to classify the detected objects in one or more categories. In an embodiment, the one or more categories may include, but are not limited to, a human category, and an obstacle category. All the objects that correspond to a human being are categorized in the human category and all other objects are categorized in the obstacle category. It may be contemplated that there may exist other categories in addition to the aforementioned categories without departing from the scope of the disclosure.

In an embodiment, the object tracker 212 may correspond to the set of instructions that enables the processor 202 to track the detected objects in the video stream or through the plurality of image frames captured by the image capturing device 204. The object tracker 212 may utilize one or more known algorithms to track the detected objects. Examples of such algorithms may include, but are not limited to, a kernel based tracking, and a contour tracking.

A person having ordinary skills in the art would appreciate that the scope of the disclosure is not limited to implementing the classifier 210 and the object tracker 212 as the set of instructions. In an embodiment, the classifier 210 and the object tracker 212 may be implemented on an application specific integrated circuits (ASIC) or FPGA that are in communication with the processor 202, without departing from the scope of the disclosure.

Referring back to the memory device 208, the memory device 208 may further be configured to store image data pertaining to the image of the worksite 100 (hereinafter referred to as a first image) captured by the image capturing device 204, previously processed images thereinafter referred to as a second image). Further, the memory device 208 may be configured to store the information pertaining to the detected objects in the first image and the second image. In an embodiment, the information associated with the detected objects may include, but are not limited to, one or more key features associated with the detected objects, a type of the detected objects, and a location of the detected objects in the image. In certain implementations, the memory device 208 may be further configured to store a training data that is utilized to train the classifier 210. The training of the classifier 210 has been described later. Some of the commonly known memory device implementations include, but are not limited to, a random access memory (RAM), a read only memory (ROM), a hard disk drive (HDD), and a secure digital (SD) card.

The training unit 214 may correspond to suitable logic, circuitry, and/or interfaces that may be configured to train the classifier 210 using the training data (stored in the memory device 208). In an embodiment, the training unit 214 may utilize one or more known machine learning algorithms, such as, neural networks, radial basis functions, support vector machines (SVM), Naïve Bayes, k-nearest neighbor algorithm, and other machine learning techniques to train the classifier 210. The training of the classifier 210 has been described in conjunction with FIG. 3.

The performance evaluation unit 216 may correspond to suitable logic, circuitry, and/or interfaces that may be configured to evaluate a performance of the processor 202 based on the detection of the object and the tracking of the object in the image and the video stream, respectively, captured by the image capturing device 204. The operation of the performance evaluation unit 216 will described later in conjunction with FIGS. 4, 5, 6, and 7.

Figure 3:
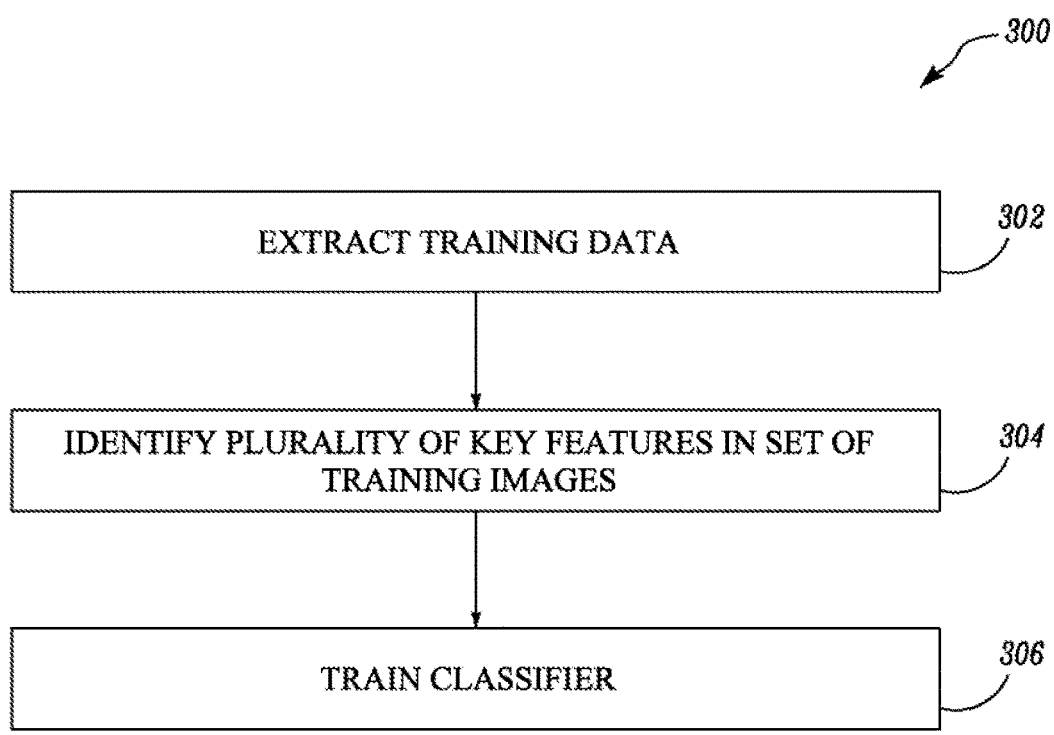
FIG. 3 illustrates a flowchart of a method of training a classifier, in accordance with certain implementations of the present disclosure.

Referring to FIG. 3, a flowchart 300 illustrating a method for training the classifier 210, is disclosed. The flowchart 300 has been described in conjunction with FIG. 2.

At step 302, the training data (stored in the memory device 208) is extracted. In an embodiment, the processor 202 is configured to instruct the training unit 214 to extract the training data. In an embodiment, the training data may include a set of training images, and the information pertaining to the objects in each image in the set of training images. In an embodiment, the information pertaining to the objects may include, but are not limited to, one or more key features of the objects, a location of the objects in an image, and/or the like. In an embodiment, the one or more key features of the object may correspond to point of interests in an image that are invariant to image scale or image rotation. In an embodiment, the location of the object in the image may correspond to a location of the pixels in the image that represents the object. For example, if the location of a pixel representing a human object is at (x1, y1), the location of the human object is considered to be (x1, y1).

At step 304, a plurality of key features are identified in each image in the set of training images. In an embodiment, the processor 202 may be configured to identify the plurality of key features in each image in the set of training images. In an embodiment, the processor 202 may utilize one or more known image processing techniques such as Scale Invariant Feature Transform (SIFT) to identify the plurality of key features.

At step 306, the classifier 210 is trained. In an embodiment, the processor 202 is configured to instruct the training unit 214 to train the classifier 210 based on the plurality of key features (identified by the processor 202 in the step 304) and the one or more key features associated with objects (extracted from the training data). In an embodiment, the training unit 214 is configured to correlate the plurality of key features to the one or more key features to create a mathematical model. Such mathematical model may correspond to the classifier 210. In an embodiment, the correlation of the plurality of key features with the one or more key features is performed using one or more known techniques such as, but are not limited to, naive Bayes and linear discriminant analysis, logistic regression and/or the like.

After training of the classifier 210, the processor 202 may be configured to operate the machine 102 in the fully autonomous mode. In the fully autonomous mode, the processor 202 may instruct the image capturing device 204 to capture one or more real time images of the worksite 100 (i.e., first image) in which the machine 102 operates. Thereafter, the processor 202 utilizes the classifier 210 to detect the first set of objects 104 in the first image. Based on the detection of the first set of objects 104, the processor 202 may operate the machine 102. In an embodiment, the processor 202 may be further configured to validate the detection of the first set of objects 104 in the first image. Such validation ensures that the detection of the first set of objects 104 is error free. Further, such validation tests the integrity of the perception system 106. The process of testing the perception system 106 has been described in conjunction with FIG. 4.

Figure 4:
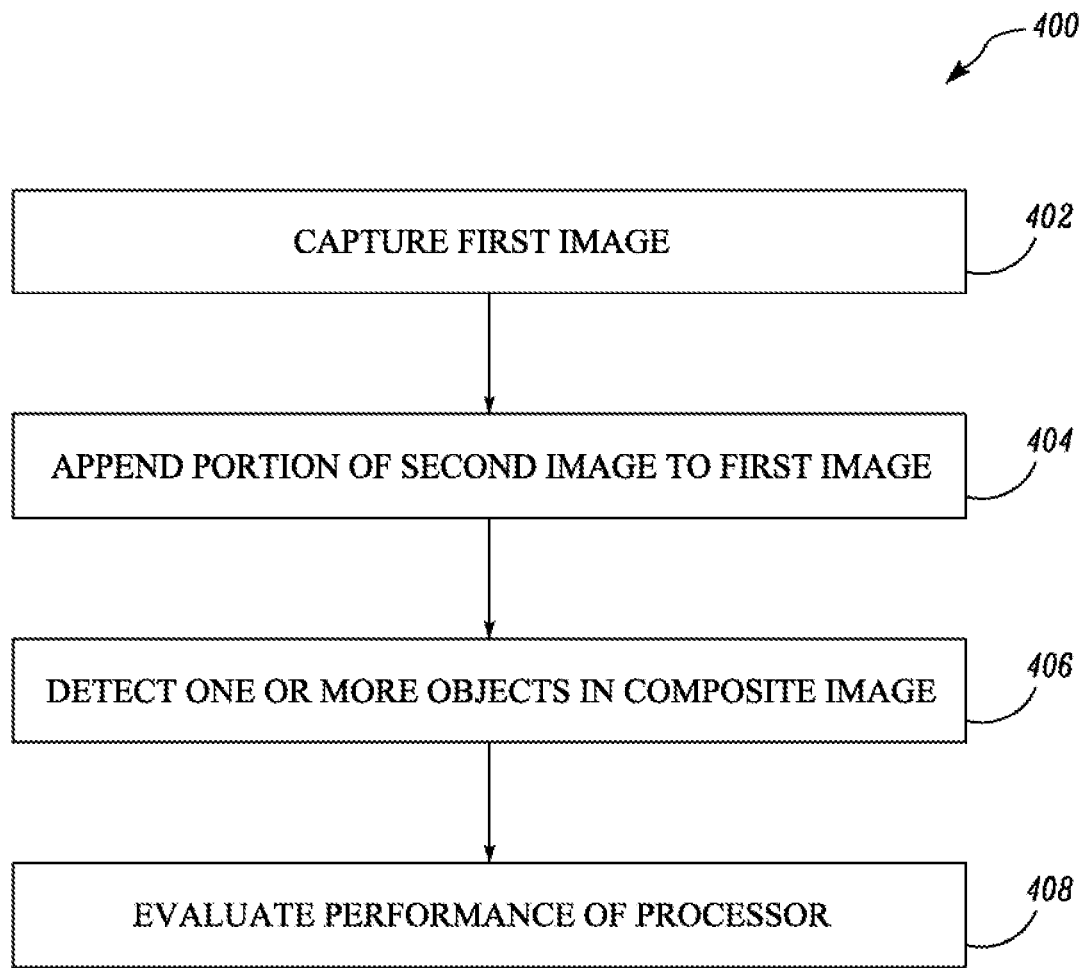
FIG. 4 illustrates a flowchart of a method for testing a perception system, in accordance with certain implementations of the present disclosure.

Referring to FIG. 4 a flowchart 400 of a method to test the perception system 106, is illustrated. The flowchart 400 has been described in conjunction with FIG. 1 and FIG. 2.

At step 402, the first image is captured. In an embodiment, the processor 202 is configured to instruct the image capturing device 204 to capture the first image. The first image may correspond to the real-time image of the worksite 100 in which the machine 102 operates.

At step 404, a portion of the second image is appended to the first image. In an embodiment, the processor 202 is configured to append the portion of the second image to the first image. As discussed, the second image corresponds to an image that has been previously processed by the processor 202. For example, the processor 202 may have previously detected a second set of objects in the second image. In alternate embodiment, the processor 202 may have not detected the second set of objects in the second image. The second set of objects may had been detected by another processor or through crowdsourcing.

To append the portion of the second image, the processor 202 may be configured to determine a size of the first image. In an embodiment, the size of the first image may correspond to a count of pixels along a length of the first image and a count of the pixels along a width of the first image. For example, the size of the first image is N×M, where N is a count of pixels along a length of the first image and M is a count of pixels along a width of the first image. Thereafter, the processor 202 is configured to randomly select a portion of the second image. In an embodiment, a width of the portion of the second image is same as the width of the first image. In alternate embodiment, a length of the portion of the second image is same as the length of the first image. A person having ordinary skills in the art would appreciate that the scope of the disclosure is not limited to the portion of the second image having either the same length as that of the first image or the same width as that of the first image. In an embodiment, the portion of the second image may be of any size.

After extracting the portion of the second image, the processor 202 may be configured to append the portion of the second image to the first image to create a composite image. Therefore, the composite image may include a portion of the second image and the first image. In an embodiment, the processor 202 may utilize one or more known image processing techniques, to append the portion of the second image to the first image.

A person having ordinary skill in the art would appreciate that the scope of the disclosure is not limited to only appending the portion of the second image to the first image. In an embodiment, more images may be appended to the first image. For example, the processor 202 may be configured to extract and append a portion of the first image to the first image itself. In yet another embodiment, the processor 202 may be configured to append a portion of a third image in addition to appending the portion of the second image to the first image. In an embodiment, the first image, the second image, and the third image may be different images.

At step 406, the one or more objects are detected in the composite image. In an embodiment, the processor 202 is configured to detect the one or more objects. To detect the one or more objects, the processor 202 is configured to extract one or more key features from the composite image by utilizing one or more image processing techniques such as SIFT, RIFT. HOG, and SURF. Thereafter, the processor 202 utilizes the classifier 210 to detect the one or more objects based on the one or more key features. As the composite image includes the first image and the portion of the second image, therefore, the processor 202 detects the first set of objects 104 in the first image and the second set of objects in the portion of the second image. Thereafter, the processor 202 is configured to transmit the information pertaining to the second set of objects to the performance evaluation unit 216.

At step 408, the performance of the processor 202 is evaluated. In an embodiment, the performance evaluation unit 216 is configured to evaluate the performance of the processor 202. The performance evaluation unit 216 is configured to receive the second set of objects from the processor 202. Further, the performance evaluation unit 216 may be configured to extract the information pertaining to the one or more previously detected objects in the second image from the memory device 208. As the discussed, the information pertaining to the one or more previously detected objects may include the one or more key features associated with each of the one or more previously detected objects, a category of each of the one or more previously detected objects, and a location of the each of the one or more previously detected objects.

Thereafter, the performance evaluation unit 216 is configured to identify a set of previously detected objects from the one or more previously detected objects. In an embodiment, the set of previously detected objects corresponds to the objects that were identified in the portion of the second image. Further, the performance evaluation unit 216 is configured to extract the information pertaining to the set of previously detected objects. The performance evaluation unit 216 is, thereafter, configured to compare the second set of objects with the set of previously detected objects to determine whether the second set of objects are same as the set of previously detected objects. In an embodiment, the performance evaluation unit 216 compares the one or more key features associated with the second set of objects with the one or more key features associated with the set of previously detected objects to determine whether the second set of objects is same as the set of previously detected objects.

In an alternate embodiment, the performance evaluation unit 216 may be configured to compare the category of the second set of objects with the category of the set of previously detected objects to determine whether the category of the second set of objects and the set of previously detected objects are same. The comparison of the types of the objects has been described later in conjunction with FIG. 6.

Additionally, to determine whether the second set of objects matches with the set of previously detected objects, the performance evaluation unit 216 may further match the location of the second set of objects (detected by the processor 202) with the location of the previously detected objects (previously detected by the processor 202). In an embodiment, the performance evaluation unit 216 may be configured to match the pixels position to determine whether the location of the second set of objects is same as the location of the previously detected objects. In an embodiment, the performance evaluation unit 216 may be configured to evaluate the performance of the processor 202 based on both the matching of the second set of objects with the previously detected objects and the matching of the location of the second of objects with the location of the previously detected objects.

In an embodiment, the performance evaluation unit 216 may be configured to determine the match between the second set of objects and the set of previously detected objects based on a combination of a match between the one or more key features, a match of a category of the objects, and a match of the location of the objects. For example, the performance evaluation unit 216 may consider the second set of objects to match with the first set of objects only if the complete information associated with the objects (i.e., the one or more key features, the type, and the location) matches with each other. In alternate embodiment, the performance evaluation unit 216 may consider the match only if any two of the one or more key features, the type, and the location matches.

If the performance evaluation unit 216 determines that the second set of objects is same as the set of previously detected objects, the performance evaluation unit 216 is configured to validate the detection of the first set of objects in the first image. However, if the performance evaluation unit 216 determines that the second set of objects is not same as the set of previously detected objects, the performance evaluation unit 216 is configured to generate a signal indicating an improper performance of the processor 202.

A person having ordinary skills in the art would appreciate that the scope of the disclosure is not limited to validating the performance of the processor 202 based on the comparison of the second set of objects with the set of previously detected objects. In an embodiment, the performance evaluation unit 216 may be further configured to validate the performance of the processor 202 by validating the tracking of the object in a video stream. The process of validating the tracking of the object in the video stream has been described in conjunction with FIG. 5.

Figure 5:
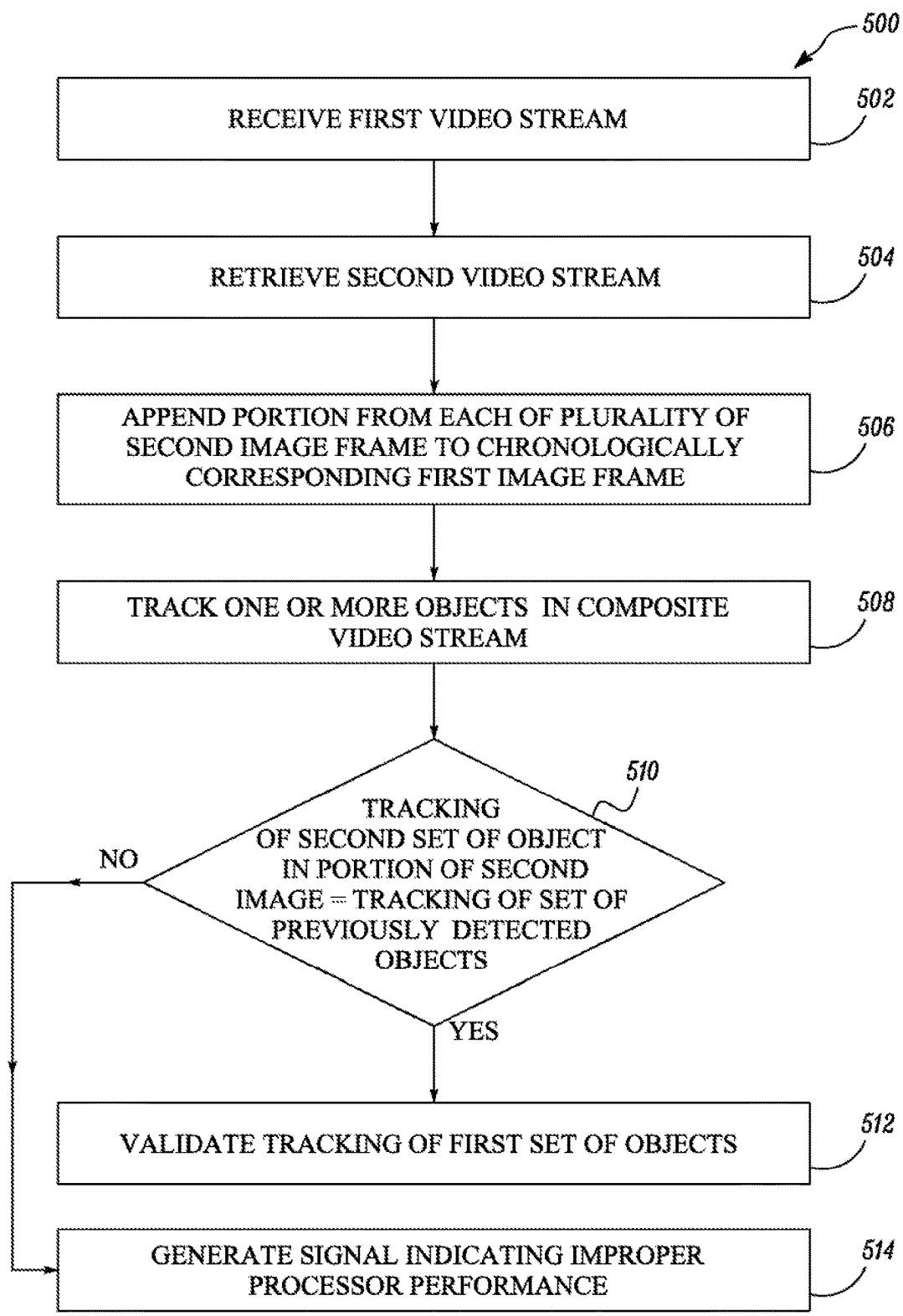
FIG. 5 illustrates a flowchart of another method for testing a perception system, in accordance with certain implementations of the present disclosure

Referring to FIG. 5, a flowchart 500 of a method for testing the perception system 106 by validating the tracking of the one or more objects in a video stream. The flowchart 500 has been described in conjunction with FIG. 2. FIG. 3, and FIG. 4.

At step 502, a first video stream is received. In an embodiment, the processor 202 may be configured to receive the first video stream from the image capturing device 204. A person having ordinary skill in the art would appreciate that the first video stream includes a plurality of first image frames. For the purpose of the ongoing description, it is assumed that a count of the plurality of first image frame is N.

At step 504, a second video stream is retrieved from the memory device 208. In an embodiment, the processor 202 is configured to retrieve the second video stream from the memory device 208. In an embodiment, the second video stream include a plurality of second image frames. Further, a count of the plurality of the second image frames is same as the count of the plurality of the first image frames (i.e., N).

At step 506, a portion from each of the plurality of second image frames is appended to a chronologically corresponding first image frame of the plurality of the first image frames. In an embodiment, the processor 202 is configured to append the portion of the second image frame of the plurality of second image frames to the first image of the plurality of image frame in accordance with the chronological order associated with the plurality of first image frames and the plurality of second image frames. For example, the plurality of first image frames includes $1^{st}$ first image frame, $2^{nd}$ first image frame, .... $N^{th}$ first image frame. Further, the plurality of second image frames includes $1^{st}$ second image frame, $2^{nd}$ second image frame, .... $N^{th}$ second image frame. The processor 202 is configured to append the portion of the $1^{st}$ second image frame with the $1^{st}$ first image frame.

Similarly, the processor 202 is configured to append the portion of the $2^{nd}$ second image frame with the $2^{nd}$ first image frame.

In an embodiment, coordinates of the portion extracted from each of the plurality of second image frames are same. For example, if the coordinates of the portion extracted from the $1^{st}$ second image frame is (x1, y1), (x2, y2), (x3, y3), and (x4, y4). Therefore, the processor 202 is configured to extract the portion having same coordinates from other second image frames (i.e., (x1, y1), (x2, y2), (x3, y3), and (x4, y4)). However, a person having ordinary skill in the art would appreciate that the scope of the disclosure is not limited to extracting the portion having same coordinates from the plurality of second frames. In an embodiment, portions having different coordinates may be extracted and accordingly appended to the corresponding plurality of first image frames. As the portion of the plurality of second image frames (corresponding to the second video stream) is appended to the plurality of first image frames (corresponding to the first video stream), therefore a composite video stream is formed that include first image frames and the portion of the second image frames. Hereinafter, the composite video stream is said to include a plurality of composite image frames.

At step 508, the one or more objects are tracked in the composite video stream. In an embodiment, the processor 202 is configured to track the one or more objects in the composite video stream. To track the one or more objects in the composite video stream, the processor 202 may be configured to detect the one or more objects in each of the plurality of composite image frames using the classifier 210. In an embodiment, the processor 202 may utilize similar methodology as described in the step 406 to detect the one or more objects. As described above, the processor 202 is configured to detect the first set of objects in the first image frame of the plurality of first image frames and the second set of objects in the portion of the second image frame. In an embodiment, the set of first objects and the set of second objects constitute the one or more objects.

Thereafter, the processor 202 is configured to track the one or more objects through the plurality of composite image frames. In an embodiment, the processor 202 is configured to track the one or more objects through the plurality of composite frames by utilizing the object tracker 212. In an embodiment, the tracking of the one or more objects may involve determining the coordinates of the one or more objects in through the plurality of composite image frames. For example, the an object has coordinates (x1, y1) in a first composite frame and (x2, y2) in a second composite frame. Tracking the movement of the object from (x1, y1) to (x2, y2) corresponds to the object tracking.

In an embodiment, by tracking the one or more objects through the plurality of composite image frames, the processor 202 is configured to track the first set of objects (detected in each of the plurality of first image frames) and the second set of objects (detected in each of the plurality of second image frames).

At step 510, a check is performed to determine whether the tracking of the second set of objects is same as the tracking of the set of previously detected objects. In an embodiment, the performance evaluation unit 216 is configured to perform the check. In an embodiment, the performance evaluation unit 216 is configured to extract the tracking information associated with the previously detected objects in the second video stream. In an embodiment, the tracking information may include information pertaining to the coordinates that the previously detected objects may have tracked through the plurality of second image frames. Thereafter, the processor 202 may be configured to determine the tracking of the set of previously detected objects (that is detected in the portion of each of the plurality of the second image frame).

The performance evaluation unit 216 is configured to compare the tracking of the set of previously detected objects with the tracking of the second set of objects. In an embodiment, the comparison may involve chronologically comparing the coordinates of the set of previously detected objects (tracked through the plurality of second image frames) with the coordinates of the second set of objects (tracked through the portion of the second image frame).

If the performance evaluation unit 216 determines that the tracking information of the set of previously detected objects is same as the tracking information of the second set of objects, the performance evaluation unit 216 may perform the step 512.

At step 512, the performance evaluation unit 216 validates the tracking of the first set of objects. Referring back to step 510, if the performance evaluation unit 216 determines that the tracking information of the set of previously detected objects is not same as the tracking information of the second set of objects, the performance evaluation unit 216 performs the step 514.

At step 514, the performance evaluation unit 216 is configured to generate the signal indicating an improper performance of the processor 202.

INDUSTRIAL APPLICABILITY

Figure 6:
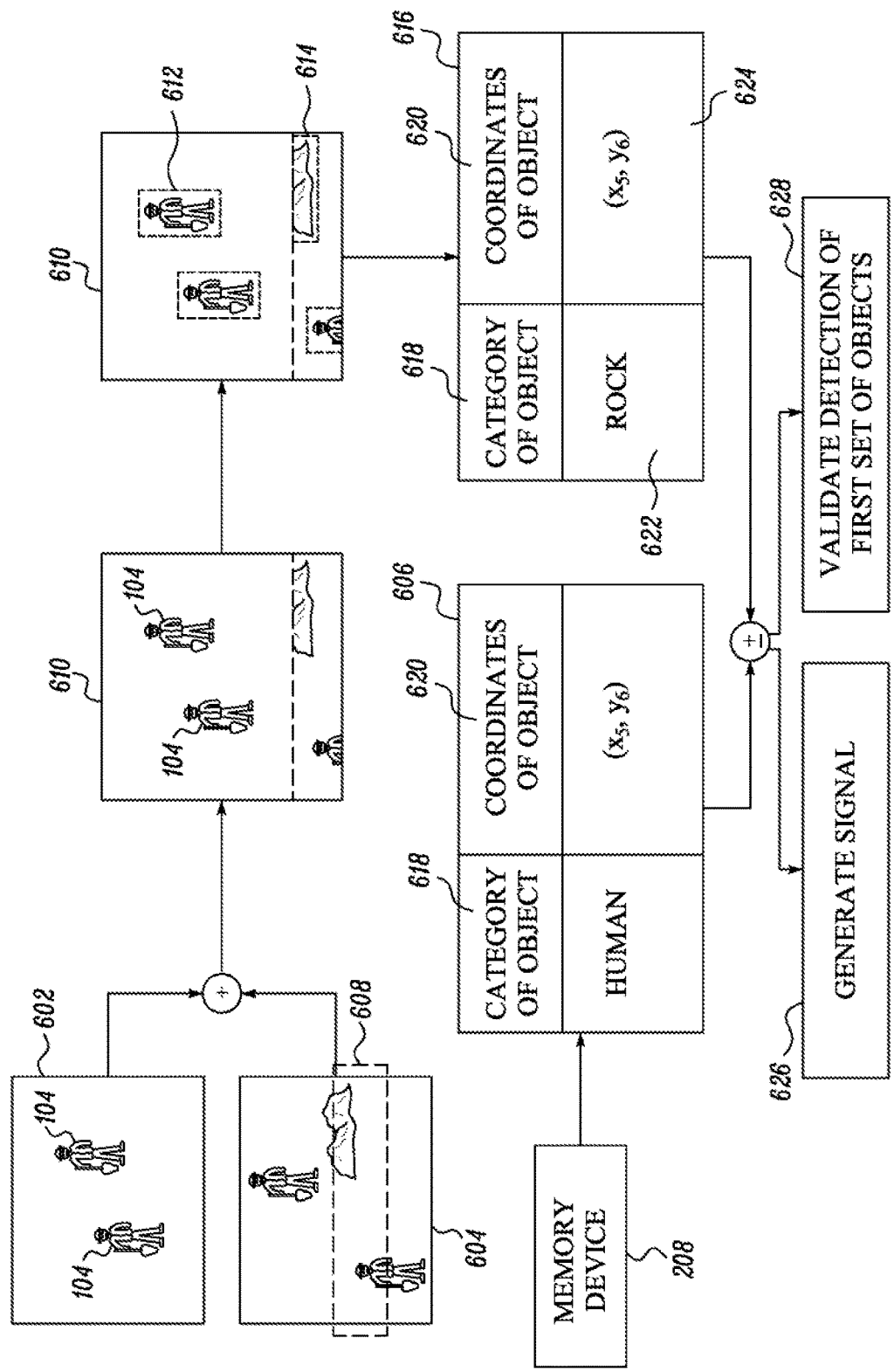
FIG. 6 is a flow diagram illustrating an exemplary scenario of testing the perception system, in accordance with certain implementations of the present disclosure.

Referring to FIG. 6, a flow diagram 600 of an exemplary scenario of testing the perception system 106, is disclosed. The flow diagram 600 has been described in conjunction with FIG. 1, FIG. 2. FIG. 3, and FIG. 4.

The first image 602 is captured by the image capturing device 204. In an embodiment, the first image 602 may correspond to an image of the worksite 100 that includes the first set of objects 104. The first image 602 is transmitted to the processor 202.

The processor 202 is further configured to extract the second image 604 from the memory device 208. The second image 604 may also include the image of objects. Additionally, the processor 202 is configured to extract the information pertaining to previously detected objects (depicted by 606) in the second image 604. The processor 202 may further randomly select a portion of the second image 604 (depicted by 608). Thereafter, the processor 202 may append the portion 608 of the second image 604 with the first image 602 to create a composite image 610.

The processor 202 is further configured to detect the one or more objects in the composite image 610. The detected objects include first set of detected objects (depicted by 612) in the first image 602 and the second set of detected objects (depicted by 614) in the portion 608 of the second image 604. The information (depicted by 616) pertaining to the second set of detected objects 612 is transmitted to the performance evaluation unit 216. It can be observed that the information (depicted by 616) includes information pertaining to a category of the object (depicted by 618) and coordinates of the detected object (depicted by 620). For example, a first object of the second set of detected objects 612 has a type rock (depicted by 622) and coordinates (x5, y6) (depicted by 624).

The performance evaluation unit 216 is further configured to compare the information pertaining to the previously detected objects (depicted by 606). It can be observed that the information pertaining to the previously detected objects (606) also includes information about the category of the objects (depicted by 618) and coordinates of the object (depicted by 620). The comparison involves comparing the category and coordinates of the previously detected objects with the category and coordinates of the second set of detected objects (depicted by 614).

For example, the performance evaluation unit 216 may check if there is an object in the set of previously detected objects 606 at coordinates (x5, y6). If the performance evaluation unit 216 determines that there is an object present at the coordinates (x5, y6), the performance evaluation unit 216 is configured to check is the category of the object, in the set of previously detected object, is same as the category of the object in the second set of objects. For example, the performance evaluation unit 216 determines that object category at coordinate (x5, y6) is rock in the second set of objects, however, the category of object at the coordinate (x5, y6) is human. Therefore, the performance evaluation unit 216 may generate a signal 626 indicating improper performance of the processor 202.

On the other hand, if the performance evaluation unit 216 determines that the category of the set of previously detected object is same as the category of the second set of objects, the performance evaluation unit 216 generate validates the detection of the first set of detected objects 612 (depicted by 628).

Figure 7:
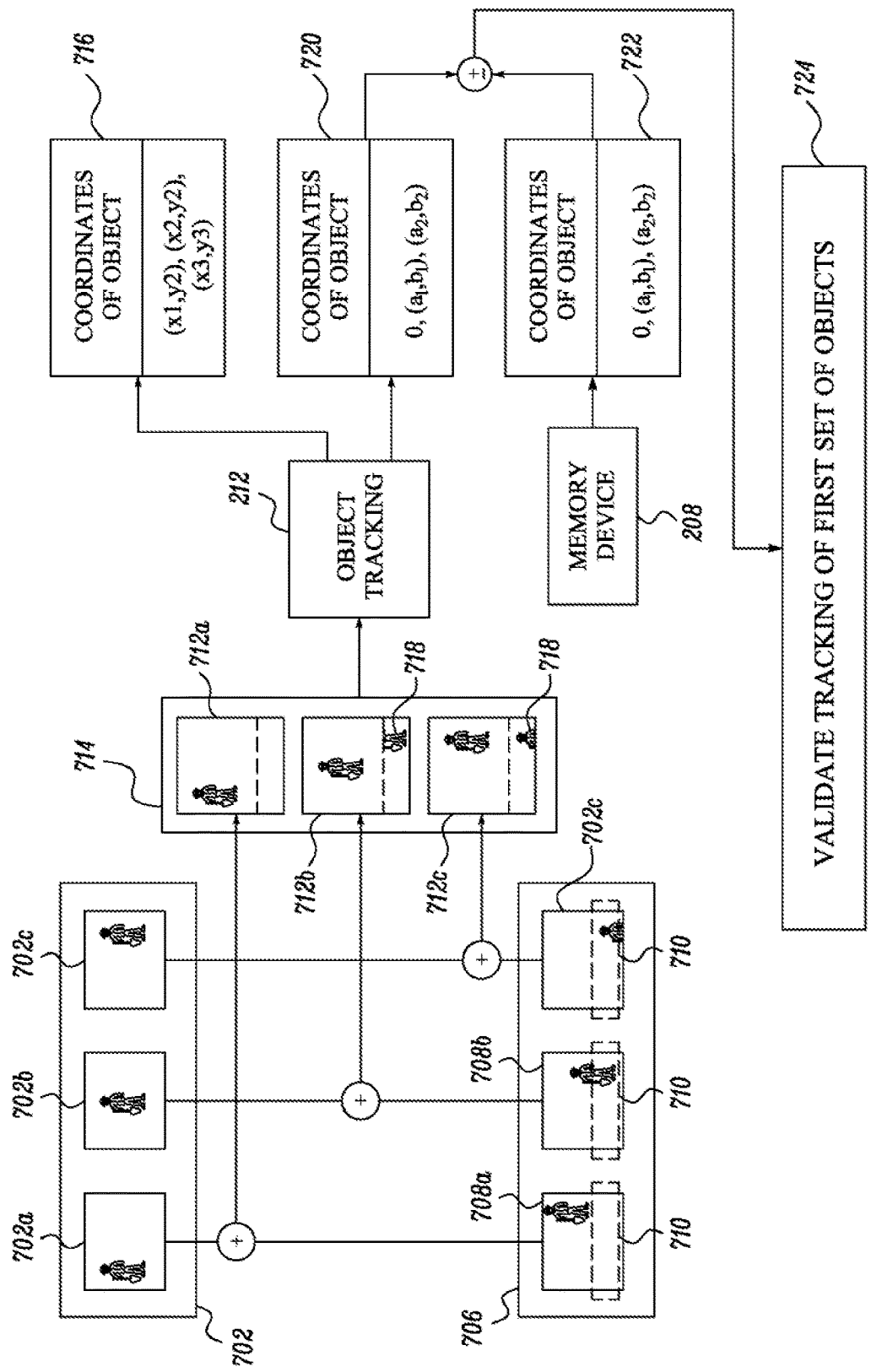
FIG. 7 is a flow diagram illustrating another exemplary scenario of testing the perception system, in accordance with certain implementations of the present disclosure.

Referring to FIG. 7, another flow diagram 700 of another exemplary scenario is disclosed. The flow diagram 700 has been described in conjunction with FIG. 1, FIG. 2, and FIG. 5.

The first video stream 702 is captured by the image capturing device 204. In an embodiment, the first video stream 702 corresponds to a video stream of the worksite 100, while the machine 102 operates in the worksite 100. From FIG. 7, it can be observed that the first video stream 702 includes three first image frames 704a, 704b, and 704c. Post obtaining the first video stream 702, the processor 202 is configured to retrieve the second video stream 706. The second video stream 706 includes three second image frames 708a, 708b, and 708c.

Further, the processor 202 is configured to identify the portion of the second image frame (for example portion 710 in second image frame 708a) in the second video stream 706. Thereafter, the processor 202 is configured to append the portion 710 extracted from each of the three second image frame 708a, 708b, and 708c to the chronologically corresponding first image frame. For example, the portion 710 from the second image frame 708a is appended to the first image frame 704a. Similarly, the portion 710 from the second image frame 708b is appended to the second image frame 704b. Such process creates three composite image frames 712a, 712b, and 712c. Further, the three composite image frames 712a, 712b, and 712c form the composite video stream 714.

Post creation of the composite video stream 714, the processor 202 is configured to track the one or more objects in the composite video stream 714 using the object tracker 212. From FIG. 7, it can be observed that an object 104 is at a left in the chronologically first image frame in the first video stream. Thereafter, the object moves to the right most end of the first image frame (as can be observed from the first image frames 704b and 704c), the object tracker 212 is configured to track such movement of the object 104. In an embodiment, the object tracker 212 is configured to determine the coordinates of the movement of the object 104 through the three first image frames 704a, 704b, and 704c.

For example, the coordinates are represented by (x1, y1), (x2, y2), (x3, y3) in the first image frames 704a, 704b, and 704c, respectively (depicted by 716). Such information corresponds to the tracking information of the object 104. Further, the object tracker 212 is configured to determine the tracking of the second set of objects in the portion 710 of the second image frame 708a, 708b, and 708c. It can be observed that, in the chronologically first composite frame 712a in the portion 710 of the second image frame 708a does not include any second object. However, in subsequent composite image frames 712b, and 712c, the second object (depicted by 718) has appeared. Therefore, the object tracker 212 determines the tracking information of the second object (depicted by 718) as (0, (a1, b1), (a2, b2)) (depicted by 720).

The performance evaluation unit 216 is, thereafter, configured to compare the tracking information pertaining to the second object 718 with the tracking information associated with the previously detected object (depicted by 722) in the portion 710 of the second image frames 708a, 708b, and 708c. It can be observed that the tracking information 722 of the previously detected object is same as the tracking information 720 of the second object 718, and therefore, the performance evaluation unit 216 validates the tracking of the object 104 (depicted by 724).

The disclosed embodiment encompasses numerous advantages. The aforementioned embodiments disclose a system for testing the perception system 106. As the detection of the objects by the perception system 106 is validated every time, therefore in case there is erroneous detection of the object, the performance evaluation unit 216 may generate a signal that allows the processor 202 to timely halt the operation of the machine 102. In alternate embodiment, the signal indicates the remote operator to shut down the operation of the machine 102. Further, such signal is indicative of corruption of the memory device 208, which may be later corrected by installing a new memory device 208.

While aspects of the present disclosure have been particularly shown and described with reference to certain implementations above, it will be understood by those skilled in the art that various additional embodiments may be contemplated by the modification of the disclosed machines, systems and methods without departing from the spirit and scope of what is disclosed. Such embodiments should be understood to fall within the scope of the present disclosure as determined based upon the claims and any equivalents thereof.

What is claimed is:

1. A method for testing a perception system, the method comprising:
   detecting, by a processor, objects in a composite image, the composite image including a first image and at least a portion of a second image, and
   the objects including:
      a first set of objects detected in the first image, and
      a second set of objects detected in the portion of the second image;
   comparing, by the processor, the second set of objects, in the portion of the second image of the composite image, with a set of previously detected objects that were detected in the portion of the second image before detecting the objects in the composite image; and
   validating performance of the processor in the detecting of the first set of objects, in the first image of the composite image, based on whether the second set of objects match the set of previously detected objects.

2. The method of claim 1, further comprising:
sending a signal indicating an improper performance of the processor in the detecting of the first set of objects, in the first image of the composite image, when the second set of objects docs does not match the set of previously detected objects.

3. The method of claim 1, further comprising:
receiving, by the processor, the first image from an image capturing device.

4. The method of claim 1, further comprising:
appending, by the processor, the portion of the second image to the first image to create the composite image.

5. The method of claim 1,
wherein the composite image further includes a portion of a third image, and
wherein the third image includes one or more previously detected objects.

6. The method of claim 1, wherein the set of previously detected objects were previously detected by the processor.

7. The method of claim 1, wherein the composite image further comprises a portion of the first image appended to the first image.

8. The method of claim 1,
wherein the first image corresponds to an image frame of a first video stream,
wherein the portion of the second image corresponds to a portion of an image frame of a second video stream,
wherein the first video stream corresponds to a real-time video being captured by an image capturing device, and
wherein the second video stream corresponds to a historical video stream previously captured by the image capturing device.

9. The method of claim 8, further comprising:
tracking, by the processor, the first set of objects and the second set of objects in the first video stream and the second video stream, respectively.

10. The method of claim 9, further comprising:
comparing, by the processor, the tracking of the second set of objects with tracking of the set of previously detected objects in the second video stream.

11. The method of claim 10, further comprising:
validating, by the processor, the tracking of the first set of objects in the first video stream based on the comparing of the tracking of the second set of objects with the tracking of the set of previously detected objects.

12. An image capturing device comprising:
an image sensor;
a processor, coupled to the image sensor, configured to:
  detect objects in a composite image,
    the composite image including a first image and at least a portion of a second image, and
    the objects including:
      a first set of objects detected in the first image, and
      a second set of objects detected in the portion of the second image;
  compare the second set of objects, in the portion of the second image of the composite image, with a set of previously detected objects that were detected in the portion of the second image before detecting the objects in the composite image; and
  validate a performance of the processor in detecting the first set of objects, in the first image of the composite image, based on whether the second set of objects match the set of previously detected objects.

13. The image capturing device of claim 12, wherein the processor is further configured to:
send a signal indicating an improper performance of the processor in the detecting of the first set of objects, in the first image of the composite image, when the second set of objects do not match the set of previously detected objects.

14. The image capturing device of claim 12, wherein the processor is further configured to:
append the portion of the second image to the first image to create the composite image.

15. The image capturing device of claim 12,
wherein the composite image further includes a portion of a third image, and
wherein the third image includes one or more previously detected objects.

16. The image capturing device of claim 12, wherein the set of previously detected objects were previously detected by the processor.

17. The image capturing device of claim 12,
wherein the first image corresponds to an image frame of a first video stream,
wherein the portion of the second image corresponds to a portion of an image frame of a second video stream,
wherein the first video stream corresponds to a real-time video being captured by the image capturing device, and
wherein the second video stream corresponds to a historical video stream previously captured by the image capturing device.

18. The image capturing device of claim 17, wherein the processor is further configured to:
track the first set of objects and the second set of objects in the first video stream and the second video stream, respectively.

19. The image capturing device of claim 18, wherein the processor is further configured to:
compare the tracking of the second set of objects with tracking of the set of previously detected objects in the second video stream.

20. The image capturing device of claim 19, wherein the processor is further configured to:
validate the tracking of the first set of objects in the first video stream based on the comparing of the tracking of the second set of objects with the tracking of the set of previously detected objects.

* * * * *